United States Patent [19]

Na

[11] Patent Number: 5,359,543
[45] Date of Patent: Oct. 25, 1994

[54] APPARATUS AND METHOD FOR GENERATING TEST PATTERN OF FREQUENCY CONVERTER

[75] Inventor: Il K. Na, Anyang, Rep. of Korea

[73] Assignee: Samsung Electronics Co., Ltd., Kyunggi, Rep. of Korea

[21] Appl. No.: 863,108

[22] Filed: Apr. 3, 1992

[30] Foreign Application Priority Data

Sep. 9, 1991 [KR] Rep. of Korea .................. 91-15881

[51] Int. Cl.$^5$ .................. G01M 19/00; H04N 17/00
[52] U.S. Cl. .................. 364/550; 348/178; 348/189
[58] Field of Search .................. 304/550, 551.01, 514, 304/481, 483; 358/10, 139, 165, 192.1; 348/177, 178, 190, 191, 189

[56] References Cited

U.S. PATENT DOCUMENTS

| | | | |
|---|---|---|---|
| 4,500,920 | 2/1985 | Ohyama et al. | 358/139 |
| 4,901,147 | 2/1990 | Tajima | 358/10 X |
| 4,974,080 | 11/1990 | Fritchie et al. | 358/10 X |
| 5,055,928 | 10/1991 | Klingelhofer | 358/10 X |
| 5,119,200 | 6/1992 | Van Den Hombergh et al. | 358/165 X |

Primary Examiner—Jack B. Harvey
Assistant Examiner—Eric W. Stamber
Attorney, Agent, or Firm—Sughrue, Mion, Zinn, Macpeak & Seas

[57] ABSTRACT

A test pattern generating apparatus and method of a frequency converter in a VCR, in which an on-screen display (OSD) circuit is used to output a test pattern instead of using an internal test pattern generator. The apparatus includes a microprocessor for outputting data, clock, and strobe signals to the OSD circuit in response to the operation of a test switch, video and audio muting circuits for muting the video and audio signals input signals to the frequency converter in response to the operation of the test switch, and the OSD circuit for generating the test pattern in accordance with an output of the microprocessor.

18 Claims, 2 Drawing Sheets

FIG. 2A STROBE

FIG. 2B CLOCK

FIG. 2C DATA —⟨ ADDRESS ⟩⟨ OSD CHARACTER DATA ⟩—

FIG. 3
| 0 | 1 | 2 | 3 | | 21 | 22 | 23 |
|---|---|---|---|---|---|---|---|
| 24 | 25 | 26 | 27 | | 45 | 46 | 47 |
| 192 | 193 | 194 | 195 | | 213 | 214 | 215 |
|---|---|---|---|---|---|---|---|
| 216 | 217 | 218 | 219 | | 237 | 238 | 239 |
FIG. 4
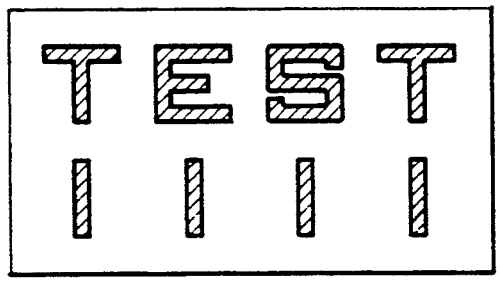
FIG. 5
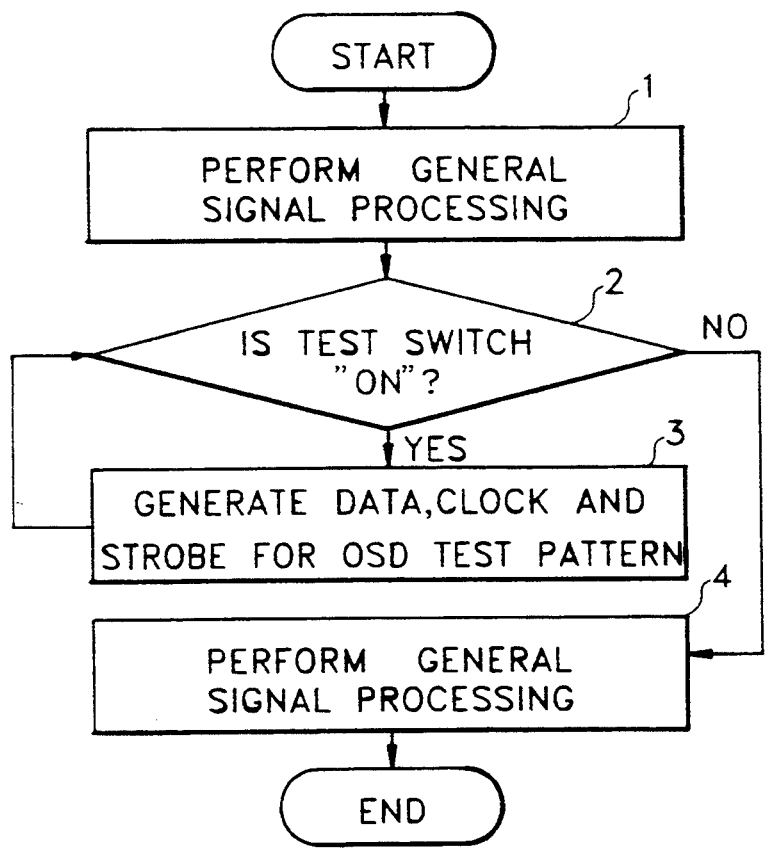

APPARATUS AND METHOD FOR GENERATING TEST PATTERN OF FREQUENCY CONVERTER

FIELD OF THE INVENTION

The present invention relates to a radio frequency (RF) converter of a video cassette recorder (VCR), and more particularly, to a test pattern generating system using an on-screen display (OSD) function instead of an internal test pattern generator.

BACKGROUND OF THE INVENTION

At present, VCRs use different types of RF converters, namely, VHF converters and UHF converters. In Eastern and Western Europe using the PAL system, the RF output of the UHF output of a VHF converter can be varied from between 30 to 40 channels. The RF output of a VHF converter in Japan using the NTSC system has two channels: 1 and 2. The RF output of a VHF converter in Korea and the United States also has two channels: 3 and 4. Accordingly, the broadcasting channel may be the same as the RF output channel of a VCR in the area where the UHF band is employed so that a user can adjust the RF output to avoid mutual interference. That is, since the outgoing channel can be linearly varied in a UHF converter of a VCR, a test pattern which can serve as a reference for fine tuning is utilized by selecting one channel which is not utilized as the broadcasting channel in order to set (tune) the output of the VCR.

In a conventional UHF converter, the test pattern is formed using a test pattern generator. However, the addition of a test pattern generator increases the manufacturing cost.

SUMMARY OF THE INVENTION

It is therefore an object of the invention to provide an apparatus and method for generating a test pattern of a frequency converter which does not require a test pattern generator.

It is another object of the present invention to provide an apparatus and method for generating a test pattern of a frequency converter, wherein, when a test switch is operated, a test pattern is displayed on a cathode ray tube (CRT) by an OSD (on-screen display) circuit of a VCR under the control of a microprocessor.

It is still another object of the present invention to provide a frequency converter which is competitive in price and which can vary a test pattern generating method essentially needed in a UHF converter adapted to a VCR.

To achieve these and other objects of the present invention, there is provided a test pattern generating apparatus adapted to a frequency (UHF) converter including a video AM modulator for amplitude-modulating a received video signal of a VCR in the (UHF) band, an audio FM modulator for frequency-modulating a received audio signal of the VCR in the frequency (UHF) band, and a mixer for outputting a UHF signal by synthesizing the outputs from the video AM modulator and the audio FM modulator, the apparatus comprises:

a microprocessor for operating a predetermined program in response to the operation of a test switch, and for generating and outputting strobe, clock and data signals corresponding to a predetermined test pattern in accordance with the program;

a muting circuit for muting the video and audio signals input to the frequency (UHF) converter in response to the operation of the test switch; and an on-screen display circuit for generating the test pattern corresponding to the data supplied from the microprocessor under the control of the microprocessor.

The present invention also provides a test pattern generating method of a test pattern generating apparatus having a microprocessor, an OSD circuit, muting circuits, and a test switch, adapted to a frequency (UHF) converter of a VCR which includes a video AM modulator, an audio FM modulator, a frequency (UHF) carrier oscillator, and a mixer, the method comprising the steps of:

checking whether or not the test switch is turned on;

outputting predetermined data, strobe and clock signals for controlling the OSD circuit from the microprocessor when the test switch is turned on;

muting the video and audio signals of the VCR, generating a predetermined test pattern in accordance with the data, strobe, and clock supplied from the microprocessor, and outputting the generated signals, when the test switch is turned on; and modulating the video and audio signals of the VCR in the frequency (UHF) band, and outputting the modulated signals, when the test switch is not turned on.

BRIEF DESCRIPTION OF THE DRAWINGS

Other objects and advantages of the present invention will become more apparent by the following description with reference to accompanying drawings, in which:

FIGS. 2A, 2B and 2C are timing charts of signals supplied from the microprocessor to the OSD shown in FIG. 1;

FIG. 3 is an illustration of addresses relating to the picture construction of a test pattern;

FIG. 4 is an illustration of a test pattern; and

FIG. 5 is a flowchart showing a test pattern generating method according to the present invention.

DETAILED DESCRIPTION OF A PREFERRED EMBODIMENT

Figure 1:
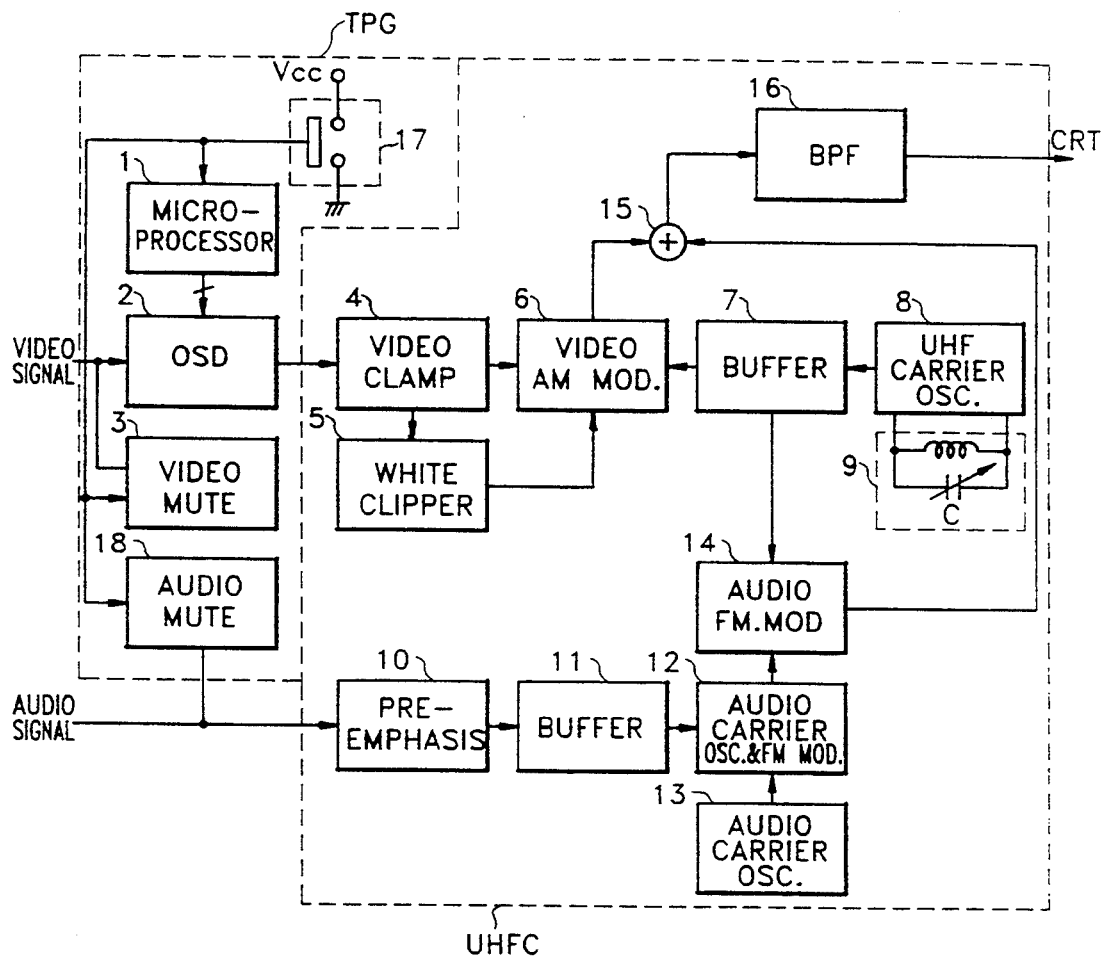
FIG. 1 is a block diagram showing the construction of an RF converter of a VCR to which a test pattern generating apparatus according to the present invention is applied.

A preferred embodiment of the invention will now be described in connection with a UHF converter.

As shown in FIG. 1, the apparatus includes a UHF converter UHFC and a test pattern generator TPG. In the UHFC, a video signal that has been stabilized by a video clamp circuit 4 and a white clipper circuit 5 is amplitude-modulated in video AM modulator 6. The video AM modulator 6 receives an output which has been oscillated in a UHF carrier oscillator 8 and a UHF channel varying unit 9, and buffered and amplified via a buffer 7, and then output as a UHF video signal.

On the other hand, an audio signal buffered and amplified through a pre-emphasis circuit 10 and a buffer 11 is frequency-modulated in an audio carrier oscillator/FM modulator 12 by the output from an audio carrier oscillator 13. Thereafter, the output from audio carrier oscillator/FM modulator 12 is frequency-modulated in an audio FM modulator 14 by the output from UHF carrier oscillator 8 through buffer 7. The output of audio FM modulator is thereby provided as a UHF audio signal.

The outputs from video AM modulator 6 and audio FM modulator 14 are then synthesized in a mixer 15, and output therefrom as a UHF signal via a band-pass filter (BPF) 16.

At this time, fine tuning is carried out in the UHF convertor of the VCR to set the UHF output of the VCR so as to not interfere with a broadcasting channel.

As shown in FIG. 1, the test pattern generator TPG includes a test switch 17, a microprocessor 1, a video mute circuit 3, an audio mute circuit 18, and an OSD circuit 2. The test pattern generator TPG does not use the conventional test pattern generator, thus eliminating a switching unit between OSD circuit 2 and video clamp circuit 4 for shifting the output of the conventional test pattern generator and the output of OSD circuit 2.

Referring to the TPG of FIG. 1, microprocessor 1 outputs data, clock and strobe signals to OSD circuit 2 in response to the operation of test switch 17 (i.e., switch 17 is switched on).

Further, in response to the operation of test switch 17, video mute circuit 3 and audio mute circuit 18 mute the input video signal and audio signal, respectively. Accordingly, OSD circuit 2 generates a test pattern under the control of microprocessor 1.

The microprocessor 1 performs the test pattern generating process in accordance with the flowchart shown in FIG. 5. Referring to FIG. 5, microprocessor 1 continuously processes the video and audio signals input to the VCR as illustrated in step 1. The microprocessor 1 determines whether or not test switch 17 has been manipulated by the user (i.e., whether switch 17 is "on") in step 2. When test switch 17 is turned "ON", data clock and strobe signals are provided for outputting the test pattern (which will be a reference signal for fine tuning) to OSD circuit 2. The data corresponding to the test pattern is stored in a memory device such as a ROM or RAM (not shown) within microprocessor 1, and microprocessor 1 supplies the data stored in the memory device to OSD circuit 2 upon the user's pressing of test switch 17. If test switch 17 is turned "off" in step 2, then microprocessor 1 proceeds to step 4 to perform the general signal processing as in step 1.

The program shown in FIG. 5 is released when test switch 17 is shifted to its original position.

When the strobe, clock and data signals respectively shown in FIGS. 2A, 2B and 2C are supplied to OSD circuit 2, the test pattern is output to the screen in accordance with the designated address shown in FIG. 3, thereby displaying the test pattern on the screen as shown in FIG. 4. As shown in FIG. 2C, the data signals contain an address and OSD character data. Further, as indicated above, FIG. 3 illustrates the addresses relating to the picture construction of the test pattern. As shown in FIG. 3, the addressing may be in the form of a matrix which includes 240 different pixels 0–239.

Hereinafter, the operation of the test pattern generating apparatus TPG will be described in detail with reference to the accompanying drawings.

Referring to FIG. 1, a UHF output channel of the VCR is first selected, and the test switch 17 is turned "on" to obtain the reference signal for fine-tuning. Upon turning "on" test switch 17, video mute circuit 3 and audio mute circuit 18 operate to mute the video and audio signals input through OSD circuit 2 and pre-emphasis circuit 10. In other words, the input video and audio signal is prevented from being modulated by the UHF converter UHFC.

At the same time, after recognizing that test switch 17 has been turned "on", microprocessor 1 supplies the strobe, clock and data signals to OSD circuit 2. Thereafter, OSD circuit 2 converts the supplied data into a test pattern video signal, and supplies the converted signal to the video clamp circuit 4. The test pattern video signal generated from OSD circuit 2 is converted into a stable test pattern video signal by video clamp circuit 4 and white clipper circuit 5, and then supplied to video AM modulator 6, as discussed above.

On the other hand, UHF carrier oscillator 8 generates a frequency corresponding to the output frequency of the UHF converter. The generated frequency is buffered and amplified through buffer 7, and supplied to video AM modulator 6 which amplitude-modulates the test pattern video signal from OSD circuit 2 to the UHF test pattern video signal, thereby supplying the amplitude-modulated signal to mixer 15. When the test pattern generated at this time is displayed on a CRT as shown in FIG. 4, a value C of UHF channel varying unit 9 is changed to vary the output frequency, so as to display a clearer test pattern.

Meanwhile, the audio signal input to pre-emphasis circuit 10 is blocked by audio mute circuit 18, and therefore the audio signal input is not supplied to UHF converter UHFC. Thus, only the UHF test pattern video signal supplied to mixer 15 is output as the UHF signal through BPF 16. Therefore, the test pattern from OSD circuit 2 is displayed on the CRT under the control of microprocessor 1.

Various types of test patterns can be output in accordance with the program and data stored in the ROM and RAM of microprocessor 1.

As described above, in the frequency converter of the VCR according to the present invention, an OSD circuit controlled by a microprocessor is utilized to output a test pattern instead of an internal test pattern generator, thereby eliminating the need of the test pattern generator. As a result, the present invention economizes manufacturing cost, and various types of test patterns can be provided in accordance with the programs stored in the microprocessor.

What is claimed is:

1. A test pattern generating apparatus for a UHF converter including a video AM modulator for amplitude-modulating a received video signal of a VCR in a UHF band, an audio FM modulator for frequency-modulating a received audio signal of said VCR in the UHF band, and a mixer for outputting a UHF signal by synthesizing the outputs from said video AM modulator and said audio FM modulator, said apparatus comprising:

a test switch;
   a microprocessor for operating a predetermined program in response to an operation of said test switch, and for generating and outputting strobe, clock and data signals corresponding to a predetermined test pattern in accordance with said program;
   muting circuits for muting said received video and said received audio signals received by said UHF converter in response to the operation of said test switch; and
   an on-screen display circuit for generating said predetermined test pattern corresponding to said data signals supplied from said microprocessor and for supplying only the generated test pattern to the UHF converter such that the UHF converter processes only the supplied test pattern in response to the operation of said test switch.

2. A test pattern generating method of a test pattern generating apparatus having a microprocessor, an on-screen display circuit, muting circuits, and a test switch, said test pattern generating apparatus being coupled to a UHF converter of a VCR, said UHF converter including a video AM modulator, an audio FM modulator, a UHF carrier oscillator, and a mixer, said method comprising the steps of:

determining whether or not said test switch is turned on;

outputting from said microprocessor predetermined data, strobe and clock signals for controlling said on-screen display circuit when said test switch is determined to be turned on;

muting video and audio signals of said VCR, and generating a predetermined test pattern in accordance with said data, strobe, and clock signals supplied from said microprocessor, and outputting said generated test pattern when said test switch is determined to be turned on;

processing only said generated test pattern in said UHF converter when said test switch is determined to be turned on; and modulating said video and audio signals of said VCR in the UHF band, and outputting said modulated signals when said test switch is determined to not be turned on.

3. A test pattern generating apparatus for a frequency converter comprising:

a microprocessor operable for providing signals representing a predetermined test pattern;

a muting circuit operable for muting input signals to the frequency converter;

an on-screen display circuit for generating the predetermined test pattern in accordance with the signals generated by said microprocessor, and for supplying the generated test pattern to the frequency converter wherein, the frequency converter processes only the supplied test pattern from the on-screen display circuit when the muting circuit operates to mute the input signals.

4. The apparatus as defined in claim 3, further comprising a test switch, and wherein said microprocessor operates to generate the signals representing the predetermined test pattern in response to an operation of said test switch.

5. The apparatus as defined in claim 4, wherein said muting circuit operates in accordance with an operation of said test switch.

6. The apparatus as defined in claim 3, wherein said muting circuit comprises a video muting circuit and an audio mute circuit.

7. The apparatus as defined in claim 6, wherein an output of said video mute circuit is coupled to an input of said on-screen display circuit.

8. The apparatus as defined in claim 7, wherein the frequency converter for a VCR is a UHF converter.

9. The apparatus as defined in claim 3, wherein said muting circuit comprises a video mute circuit and an audio mute circuit and wherein an output of said video mute circuit is coupled to an input of said on-screen display circuit.

10. The apparatus as defined in claim 9, wherein an output of said audio mute circuit is coupled to an input of the frequency converter.

11. The apparatus as defined in claim 3, wherein the signals representing the predetermined test pattern generated by said microprocessor includes at least one of a data signal and an address signal.

12. The apparatus as defined in claim 11, wherein said data signal includes the address signal and a character data signal.

13. A method for generating a test pattern for a frequency converter, the method comprising the steps of:

muting input signals to the frequency converter;

generating a predetermined test pattern; and supplying the generated predetermined test pattern to the frequency converter so that the frequency converter processes only the supplied predetermined test pattern.

14. The method as defined in claim 13, wherein said muting step comprises muting, video and audio input signals to the frequency converter.

15. The method as defined in claim 14, further comprising the step of providing stored signals representing the predetermined test pattern, and wherein the predetermined test pattern is generated in accordance with the provided stored signals.

16. The method as defined in claim 13, further comprising the step of determining whether a test switch has been turned on, and wherein said muting, generating and supplying steps are performed when said determining step determines that the test switch has been turned on.

17. The method as defined in claim 16, wherein the frequency converter processes received input signals if said determining step fails to determine that the test switch has been turned on.

18. The method as defined in claim 13, wherein the frequency converter is a UHF converter for a VCR.

* * * * *